US008050387B1

(12) United States Patent
Putnam et al.

(10) Patent No.: US 8,050,387 B1
(45) Date of Patent: Nov. 1, 2011

(54) METHOD AND SYSTEM FOR PROVIDING CUSTOMIZED AUDIO RESPONSES TO INCOMING PHONE CALLS

(75) Inventors: Keith Lynn Putnam, Boca Raton, FL (US); William J. Beyda, Cupertino, CA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/175,156

(22) Filed: Oct. 19, 1998

(51) Int. Cl.
*H04M 1/64* (2006.01)

(52) U.S. Cl. ........................................ 379/76; 379/88.23

(58) Field of Classification Search .................. 379/67.1, 379/70, 82, 85, 87, 88.01, 88.02, 88.04, 88.11, 379/88.19, 88.2, 88.21, 88.22, 211.01, 211.02, 379/212.01, 214.01, 76
See application file for complete search history.

(56) References Cited

U.S. PATENT DOCUMENTS

| | | | |
|---|---|---|---|
| 5,029,198 A | 7/1991 | Walpole et al. | |
| 5,031,205 A | 7/1991 | Phillips | |
| 5,327,486 A * | 7/1994 | Wolff et al. | 379/93.23 |
| 5,406,618 A | 4/1995 | Knuth et al. | |
| 5,446,785 A | 8/1995 | Hirai | |
| 5,533,102 A * | 7/1996 | Robinson et al. | 379/88.25 |
| 5,544,229 A * | 8/1996 | Creswell et al. | 379/211.02 |
| 5,548,636 A * | 8/1996 | Bannister et al. | 379/88.21 |
| 5,581,604 A * | 12/1996 | Robinson et al. | 379/88.13 |
| 5,651,053 A * | 7/1997 | Mitchell | 379/210.02 |
| 5,651,055 A | 7/1997 | Argade | 379/88.01 |
| 5,652,789 A * | 7/1997 | Miner et al. | 379/201.01 |
| 5,742,905 A * | 4/1998 | Pepe et al. | 379/211.01 |
| 5,758,280 A * | 5/1998 | Kimura | 455/412.2 |
| 5,799,066 A | 8/1998 | Joyce et al. | 379/88.04 |
| 5,805,587 A * | 9/1998 | Norris et al. | 370/352 |
| 5,924,016 A * | 7/1999 | Fuller et al. | 379/202.01 |
| 5,930,700 A * | 7/1999 | Pepper et al. | 455/435.3 |
| 5,946,386 A * | 8/1999 | Rogers et al. | 379/265.09 |
| 5,963,626 A * | 10/1999 | Nabkel | 379/142.01 |
| 6,005,870 A * | 12/1999 | Leung et al. | 379/207.13 |
| 6,018,671 A * | 1/2000 | Bremer | 455/567 |

(Continued)

FOREIGN PATENT DOCUMENTS

EP 0719019 A2 6/1996

(Continued)

OTHER PUBLICATIONS

Great Britain Patent Office Search Report for GB 99199994, Oct. 11, 1999.

*Primary Examiner* — Joseph T Phan
(74) *Attorney, Agent, or Firm* — Staas & Halsey LLP

(57) ABSTRACT

A telephone answering system (100) and method (200) that permits a user to immediately generate a customized playback message in response to an incoming call without having to actually answer the call. The system (100) can include a ring detector (104), a command interface (114), a controller (110) and a telephone network interface (102). In response to an incoming call, the ring detector (104) alerts the called party and causes the controller (110) to activate the command interface (114). The command interface (114) is activated for a predetermined time while the call is still ringing. While activated, the called party can select or enter a playback message. The playback message can be a pre-recorded audio message stored within the device, or a voice message spoken by the called party during the activation period. After the playback message is selected by the called party, the telephone system (100) answers the incoming call and automatically plays the customized message to the calling party.

14 Claims, 3 Drawing Sheets

U.S. PATENT DOCUMENTS

| | | | |
|---|---|---|---|
| 6,047,057 A * | 4/2000 | Weishut et al. | 379/215.01 |
| 6,055,305 A * | 4/2000 | Norman et al. | 379/211.01 |
| 6,219,413 B1 * | 4/2001 | Burg | 379/215.01 |
| 6,400,814 B1 * | 6/2002 | Adams | 379/142.01 |
| 6,404,860 B1 * | 6/2002 | Casellini | 379/88.17 |
| 6,453,164 B1 * | 9/2002 | Fuller et al. | 455/445 |
| 6,459,785 B1 * | 10/2002 | Naumburger | 379/214.01 |
| 6,463,131 B1 * | 10/2002 | French-St. George et al. | 379/88.23 |
| 6,504,912 B1 * | 1/2003 | Glossbrenner | 379/88.01 |
| 6,519,326 B1 * | 2/2003 | Milewski et al. | 379/67.1 |
| 6,766,006 B1 * | 7/2004 | Hu et al. | 379/201.12 |
| 6,961,559 B1 * | 11/2005 | Chow et al. | 455/414.1 |
| 7,023,979 B1 * | 4/2006 | Wu et al. | 379/265.11 |
| 7,280,649 B2 * | 10/2007 | Hu et al. | 379/201.12 |
| 7,571,458 B1 * | 8/2009 | Eyal | 725/137 |
| 7,676,034 B1 * | 3/2010 | Wu et al. | 379/265.01 |
| 7,916,858 B1 * | 3/2011 | Heller et al. | 379/265.12 |

FOREIGN PATENT DOCUMENTS

| | | |
|---|---|---|
| EP | 0763958 A2 | 3/1997 |
| GB | 2318702 A | 4/1998 |
| WO | WO 93/11643 A1 | 6/1993 |

\* cited by examiner

METHOD AND SYSTEM FOR PROVIDING CUSTOMIZED AUDIO RESPONSES TO INCOMING PHONE CALLS

BACKGROUND OF THE INVENTION

1. Field of the Invention

The present invention generally relates to telephone answering devices, and in particular, to an improved method and system for selectively presenting customized audio messages to callers without answering the call or directing the call to a phone mail system.

2. Description of the Related Art

A conventional phone answering machine automatically plays a pre-recorded audio message to a caller when a called party fails to answer. A pre-recorded message is typically generic in nature, informing the caller that the called party is unavailable and that the caller may leave a message if so desired. In some instances, the answering device gives the caller the option to transfer to another destination, such as a receptionist or secretary, who can provide more information as to the whereabouts of the called party.

On occasion, a called party may be aware of an incoming call, but unable to immediately answer. For instance, the called party could be engaged in a meeting. In such instances, it may be desirable to provide a customized recorded message to the caller without actually answering the call. A customized message could provide specific information, for example, a notice that the called party will return the incoming call within a few minutes.

SUMMARY OF THE INVENTION

The present invention is embodied in a telephone answering device that permits a user to immediately generate a customized playback message in response to an incoming call without having to actually answer the call.

According to one embodiment of the present invention, the telephone device includes a ring detector, a command interface, a controller and a telephone network interface. In response to an incoming call, the ring detector alerts the called party and causes the controller to activate the command interface. The command interface is activated for a predetermined time while the call is still ringing. While activated, the called party can select or enter a playback message. The playback message can be a pre-recorded audio message stored within the device, or a voice message spoken by the called party during the activation period. After the playback message is selected by the called party, the telephone device answers the incoming call and automatically plays the customized message to the calling party.

A voice recognition unit (VRU) can be included in the command interface so that the message playback features can be controlled by spoken commands.

BRIEF DESCRIPTION OF THE DRAWINGS

The invention is pointed out with particularity in the appended claims. However, other features of the invention will become more apparent, and the invention will be best understood by referring to the following specification and accompanying drawings, in which:

DETAILED DESCRIPTION OF THE INVENTION

The invention can be embodied by any device intended to present audio messages to callers. Thus, the embodiments discussed herein are exemplary.

Figure 1:
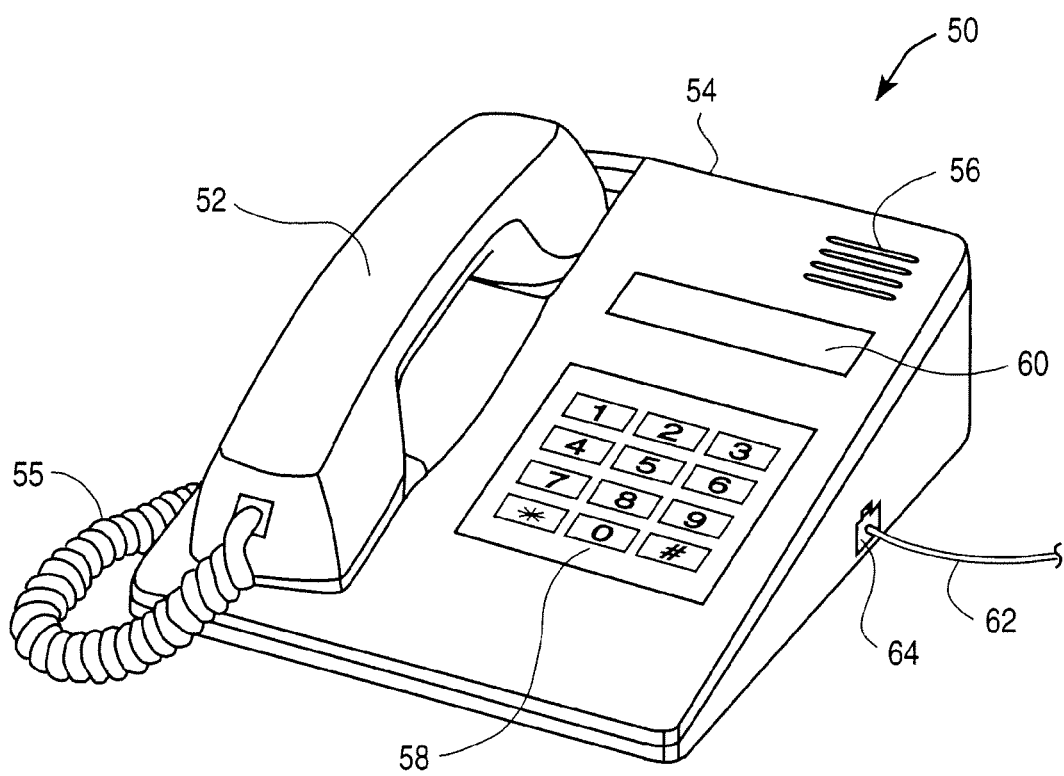
FIG. 1 illustrates a telephone device in accordance with one embodiment of the present invention.

Referring now to the drawings, FIG. 1 shows a telephone 50 that can incorporate a phone answering device in accordance with an embodiment of the present invention. The telephone 50 includes a handset 52, and a base unit 54. The handset 52 includes a conventional loudspeaker and microphone transducing audio information between a user and circuitry included within the base unit 54. Communication between the handset 52 and the base unit 54 is accomplished using a conventional telephone cord 55. Alternatively, the telephone 50 can be a cordless telephone, where the handset 52 and base unit 54 each include a respective radio frequency (RF) transceiver and the cord 55 is replaced by an RF communications link.

The base unit 54 can include a built-in conventional loudspeaker/microphone 56, a keypad 58, and a display 60. The loudspeaker/microphone 56 permits the phone 50 to operate as a speaker phone, with the handset 52 remaining cradled in an on-hook position. The keypad 58 can be a conventional telephone keypad that permits a user to manually enter phone numbers or access specialized functions provided by the phone 50. The keypad 58 can include a standard touch-tone 10-digit keypad and any number of special function keys. The base unit 54 is connectable to a conventional telephone line 62 using a standard telephone jack 64. In this arrangement, the telephone 50 receives and transmits standard analog telephony signals over the line 62. Alternatively, the phone 50 can be a digital phone that directly receives digital signals over the line 62 from a digital trunk or switch. In addition, the present invention can be embodied in a wireless telephone, such as a cellular phone, that uses a conventional cellular RF link instead of the telephone line 62 and jack 64.

Figure 2:
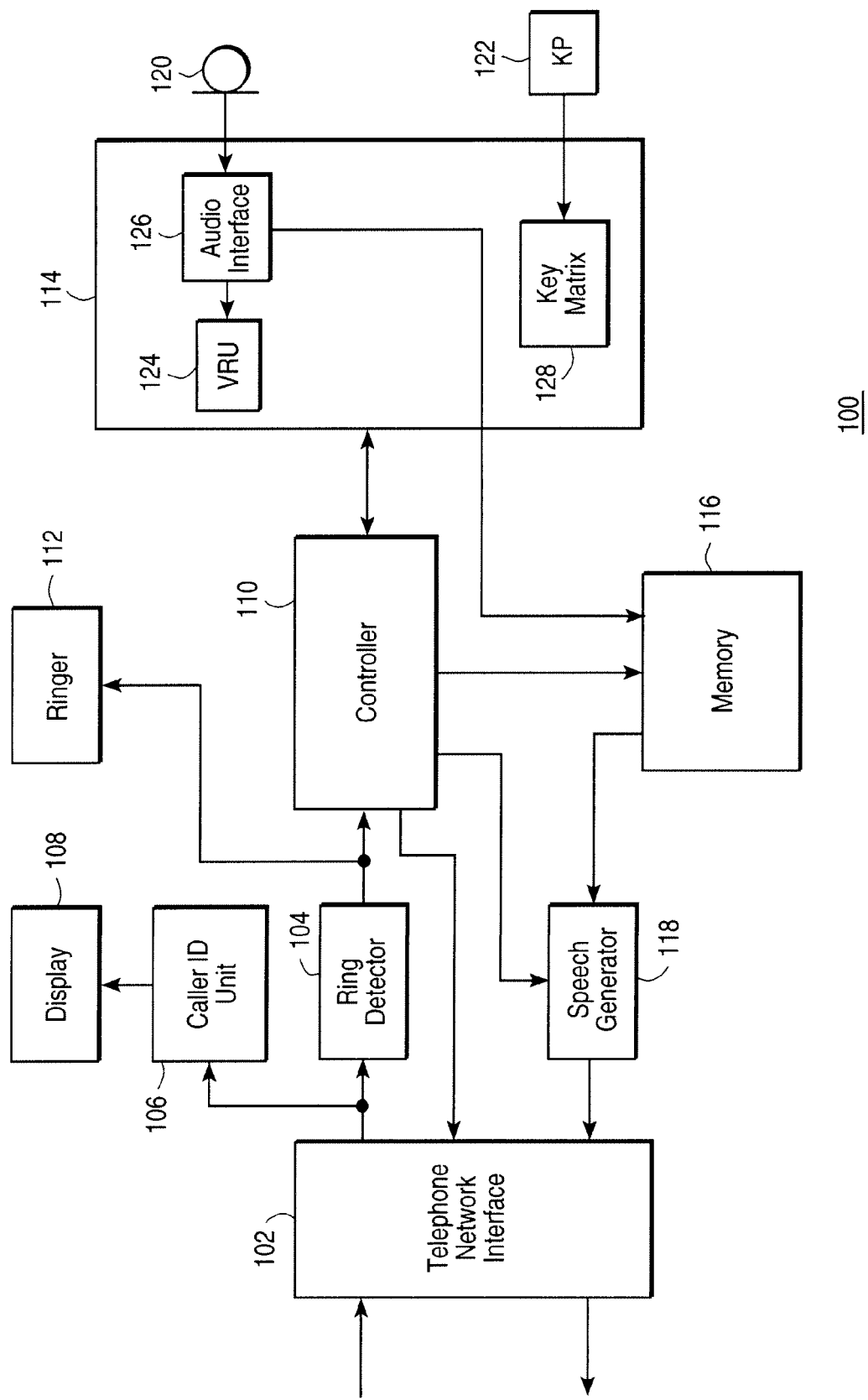
FIG. 2 illustrates a detailed block diagram of a system for generating customized messages, which can be incorporated into the telephone device of FIG. 1.

FIG. 2 illustrates a detailed block diagram of a system 100 that is includable in the phone 50 for generating customized playback messages. The system 100 includes a telephone network interface 102, a ring detector 104, an optional caller-ID unit 106, a caller-ID display 108, a controller 110, a ringer 112, a command interface 114, a memory 116, a speech generator 118, a microphone 120 and a keypad 122.

The telephone network interface 102 includes standard circuitry and hardware for interfacing to a conventional telephone network. The telephone network can be a standard land line, such as the conventional telephone line 62, or a wireless telephone network, such as a cellular network, or a digital line communicating with a standard digital trunk or switch. In a conventional land line network, the telephone interface 102 can include a jack receptacle for receiving the jack 64, and can pass analog information to the ring detector 104 and the caller-ID unit 106. The telephone interface 102, likewise, passes conventional analog telephony signals to the network from the speech generator 118.

The ring detector can include conventional off-the-shelf circuitry for detecting the ring signal produced by an incoming call. Upon detecting an incoming call, the ring detector 104 generates a signal which activates the ringer 112 and sets the controller 110 into a ring state.

The caller-ID unit 106 can include commercially available circuitry for deriving caller-ID information presented by the incoming call, such as Part No. CMX602A, manufactured by MX-COM Inc., of Winston-Salem, N.C. The caller-ID information can be presented on the display 108 so that the called party can be alerted to the identification of the caller before entering a customized message. The display 108 can be any conventional alpha-numeric display, such as a liquid crystal display (LCD), and can be included in the display 60 of FIG. 1.

The caller ID function is important in that it alerts the called party to the identity of the caller prior to answering the phone. This permits the called party to tailor the playback message accordingly and would provide further motivation for using the on-the-fly message generation feature of the present invention.

When the system 100 is included in a digital phone, the caller identification information can be included in a conventional ring message generated by a digital switch. The caller information in the ring message would be presented at the display 108.

The ringer 112 can be any means for generating an audio signal to indicate the presence of the incoming call, such as a conventional bell ringer or an alert generating circuit coupled to a loudspeaker.

The command interface 114 can be activated by providing an active enable signal to the components of the interface 114. The duration of the enable signal can be set using a timer or countdown routine included in the controller 110.

In addition to controlling the command interface 114, the controller 110 can also perform functions associated with conventional telephones, such as responding to on-hook/off-hook conditions, responding to special function keys, such as speed dialing, controlling the network interface 102, and the like.

In the ring state, the controller 110 activates the command interface 114 for a predetermined period of time during which the called party can select to generate a customized response to the incoming call. As stated earlier, in response to the detection signal, the controller 110 enters a ring state.

The controller 110 can be a microprocessor executing a software program. The microprocessor can be any commercially available processor suitable for performing the functions disclosed herein, such as a microprocessor selected from the X86 family of processors or 8051 family of microcontrollers manufactured by Intel Corporation, any processor selected from the 68K or Power PC microprocessors manufactured by Motorola, Inc., or the C161RI microprocessor manufactured by Siemens Corp.

In the command interface 114, the called party selects or enters a customized audio message. As shown, the command interface 114 can include an audio interface 126 in communication with a voice recognition unit (VRU) 124 for recognizing spoken commands, as well as a key matrix circuit 128 communicating with keypad 122. Accordingly, the called party can enter commands using speech or by manually keying in the command. In alternative embodiments of the invention, the command interface 114 can include either the voice interface (VRU 124 and audio interface 126) or the keypad interface alone.

The voice and keypad interfaces can be activated by selectively enabling data busses passing data from the interfaces to the other components of the system 100. The busses can be enabled by the active enable signal from the controller 110.

User commands can include an instruction and a message parameter. The instruction directs the system 100 to perform a specific function, while the parameter is a variable attribute associated with the function. For example, the user could enter a command which includes the instruction "call back" and the parameter "ten". This command would cause the system 100 to play a customized pre-recorded or synthesized message to the caller stating that the user will call back in ten minutes. Alternatively, the user could enter the instruction "record" without parameters, whereby causing the system 100 to record a voice message for immediate playback to the caller, while the call is pending.

For entering spoken commands, the user speaks into the microphone 120, which produces an electronic signal received by the audio interface 126. The microphone 120 can be a conventional microphone built into the phone base unit 54, such as the loudspeaker/microphone 56. The audio interface 126 includes conventional audio circuitry for amplifying, filtering, sampling and converting the audio input to digital signals. The digitized audio signals are then passed to the VRU 124. The digitized audio can also be transferred to the memory 116 for storing customized messages for playback. The audio interface 126, as well as some of the functions of the interface 102, ring detector 104 and the ringer 112 can be implemented using an ARCOFI Chip, Part No. PSB2163, manufactured by Siemens Corp. In such an embodiment, the ARCOFI Chip can be readily interfaced to a conventional microprocessor performing the functions of the controller 110. The ARCOFI Chip also provides an interface to the standard loudspeaker and microphone in a phone handset, such as handset 52.

The VRU 124 is configured to recognize spoken commands uttered by the called party. The VRU 124 can include a commercially available off-the-speech recognition engine, such as Phone Query™, from Dragon Systems, Inc. of Newton, Mass.; or Speechworks from Al Tech, Inc. of Boston, Mass. Typically, the speech recognition engine is provided as software executing on a microprocessor (not shown). The microprocessor can also execute additional software routines in conjunction with the speech recognition engine, wherein the additional software routines generate control signals when the speech recognition engine identifies predetermined spoken commands. The control signals can be used to control recordation of a spoken message received by the audio interface 126, or to access pre-recorded messages stored in the memory 116.

A separate microprocessor can be used to implement the VRU 124, such as any of those listed earlier in reference to the controller 110. Alternatively, the functionality of the VRU 124 and the controller 110 can be included in software routines that are executed by a common processor.

To manually enter commands, the user enters the message parameters using the keypad 122. The key matrix circuit 128 interfaces with the keypad 122 and presents digital keyed-in information to the controller 110. The keypad 122 can be a standard touch-tone pad, such as keypad 58 shown in FIG. 1, having special function buttons dedicated to activating and controlling the customized message feature. For instance, the user could select a key which causes the controller 110 to retrieve a specific pre-recorded message from the memory 116 for playback through the speech generator 118. Alternatively, the user could also key in a command to activate the audio interface 126 so that the user can record a message for immediate playback to the caller.

When the user selects the option of recording a message on-the-fly, the audio interface is activated for a recording session having a predetermined duration. During the recording session, a digitized voice from the audio interface is temporarily stored in the memory 116. To transfer voice data from the audio interface 126 to the memory 116, the controller 110 enables data transfers over a bus correcting interface 126 and memory 116. In addition to storing messages generated on-the-fly, the memory 116 can also store pre-recorded messages at predetermined locations. The memory 116 can be any type of commercially-available computer memory, such as a Flash memory or RAM. The stored digitized voice can represent an audio message of predetermined duration.

Immediately after a message is selected or recorded, the controller 110 activates the speech generator 118 and answers the incoming call. Based on the instruction and message parameters entered by the user, the controller 110 accesses a message stored in the memory 116. Upon receiving the digitized voice from the memory 116, the speech generator 118 plays back the customized message to the caller. The speech generator 118 includes conventional circuitry for converting the digitized voice stored in the memory 116 to an analog audio signal suitable for transmission over the telephone network. The speech generator 118 can be implemented using a SAM chip, Part No. PSB2168, manufactured by Siemens Corp. In addition, the SAM chip can be used to interface the audio interface 126 to the memory 116. In such an embodiment of the invention, the controller 110 would be a microprocessor controlling the SAM chip.

In addition to telephones, the system 100 is includable in other devices, such as telephone switches and voice mail systems. In such embodiments of the invention, the system 100 would be a centralized resource, available to multiple users. The centralized arrangement of the system 100 would reduce the cost of the individual phones in the subscriber system. The telephones in this arrangement would act as dumb terminals, collecting voice and key commands and passing them over a conventional internal subscribe line to the centralized system. Accordingly, each telephone would include the display 108, the ringer 112, the microphone 120, and the key pad 122 and matrix 128. The remaining elements of the system 100 could reside at the centralized location. The controller 110 would include a software routine for responding to commands received over the subscriber line.

Users could activate the system by depressing a special function key included with each phone, which in essence would place the incoming call on hold and place a conventional phone call to an extension assigned to the centralized system 100. The subscriber switch would regulate access to the centralized system in the conventional manner that it would regulate access to other extensions. After the user selects or enters the playback message, the user terminates the call to the centralized system, which causes the switch to transfer the held call to the system 100. The system 100 then plays the customized message to the incoming caller.

Figure 3:
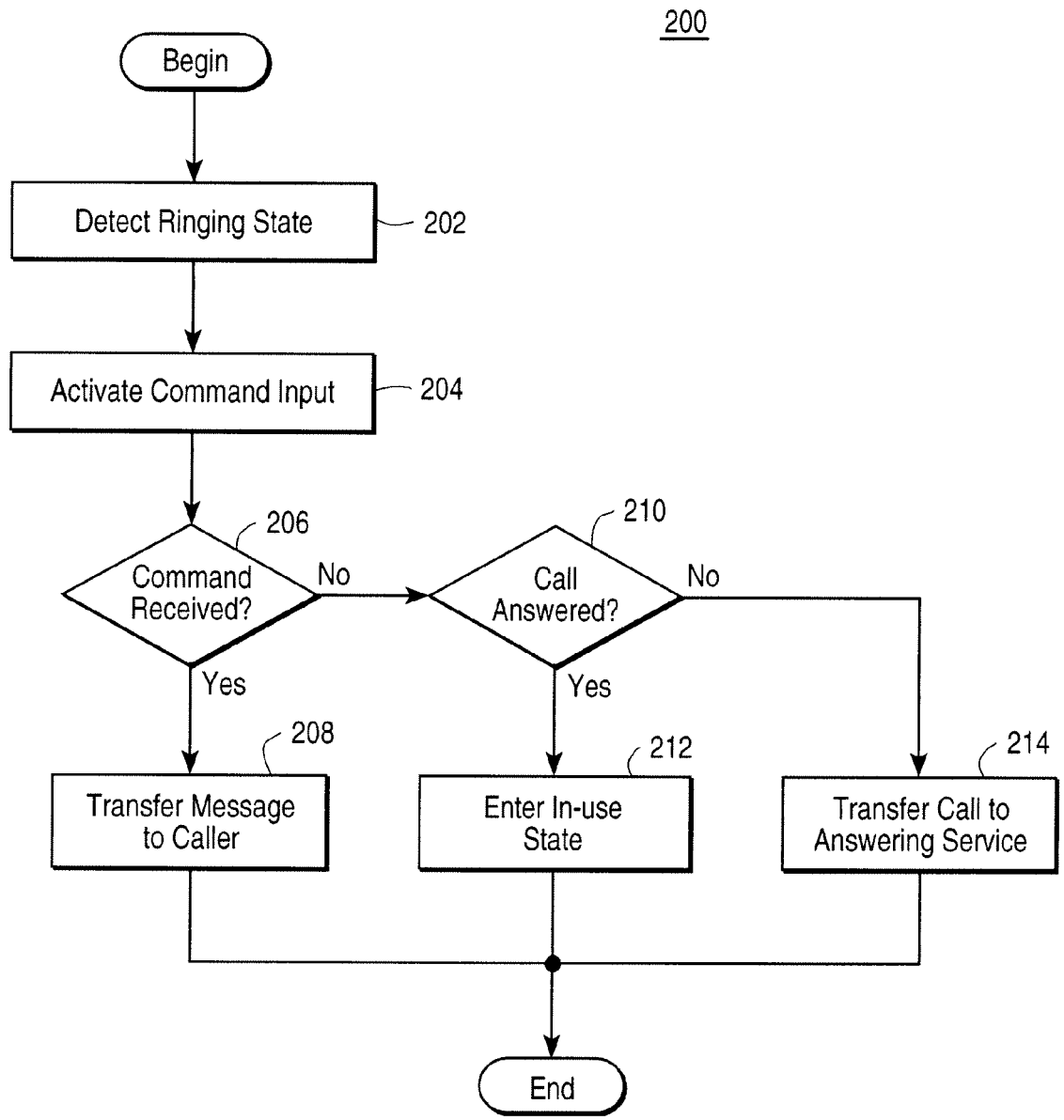
FIG. 3 is a flowchart diagram illustrating a method responding to incoming calls in accordance with another embodiment of the present invention.

FIG. 3 illustrates a flowchart diagram of a method 200 for responding to incoming calls according to another embodiment of the invention. The method 200 can be implemented as a software routine executable by the controller 110.

In step 202, the ring signal presented by the incoming call is detected. In response to the ring signal, the command interface 114 is activated (step 204). As discussed early, the interface 114 can be activated by an enable signal from the controller 110. In step 206, a check is made to determine whether the called party has entered a command via the command interface 114. The command can be entered using either the voice or keypad interface. If a command requesting the generation of a custom message has been received, the method proceeds to step 208, otherwise, the method proceeds to step 210. In step 208, the called party enters or selects an audio message while the call is pending for immediate playback to the caller. The incoming call is then answered and the message is transferred to the caller. After the message has played, the controller 110 can release the call.

In step 210, a check is made to determine whether the called party answered the incoming call. This can be accomplished by monitoring the on-hook/off-hook condition of the phone. If so, the system 100 enters an in-use state in step 212 and is deactivated until the incoming call is terminated. If the incoming call is not answered and the called party has not entered a command instructing the system 100 to generate a customized audio message, the call is transferred to a conventional answering service, such as voice mail, an answering machine, or a receptionist (step 214).

What is claimed is:

1. A system for responding to an incoming phone call from a calling party, comprising:
   means for receiving the incoming phone call;
   means for generating a user alert in response to the incoming phone call, said generating means including a ring signal detection means;
   means at a called party's telephone for enabling selective entry of a user message in response to the alert while the incoming call is pending and still ringing to the calling party;
   means for playing the user message to the calling party, said playing means including means for transmitting said user message from the called party telephone to the calling party telephone via the telephone network; and
   a timing means responsive to the ring signal detection means for timing a predetermined period during which a called party can select to generate the user message;
   wherein the selective entry means includes means for selecting between recording one or more parameters insertable in a customized pre-recorded message and recording a message without parameters while the incoming call is pending;
   wherein the receiving means includes a voice recognition unit for recognizing at least one spoken command;
   wherein the at least one spoken command includes a predetermined instruction and a variable parameter.

2. The system of claim 1, further comprising means for releasing the call after playing the user message.

3. The system of claim 1, further comprising means for displaying caller identification information to the user.

4. The system of claim 1, wherein the receiving means includes means for activating a user command interface for a predetermined period of time following commencement of the user alert.

5. The system of claim 1, wherein the receiving means includes a voice recognition unit for recognizing at least one spoken command.

6. The system of claim 1, wherein the receiving means includes means for manually selecting the user message.

7. The system of claim 1, wherein the means for receiving includes means for recording an audio user message.

8. The system of claim 1, wherein the means for receiving includes means for storing the user message.

9. The system of claim 1, wherein the system is incorporated within a telephone.

10. The system of claim 1, wherein said means for playing the user message to the calling party is configured to cause playing the user message to the calling party in some instances in which the user refuses to answer the incoming phone call.

11. The system of claim 1, wherein the means for generating a user alert in response to the incoming phone call comprises means for detecting the incoming phone call based on the incoming phone call.

12. The system of claim 11, wherein the means for detecting the incoming phone call comprises means for detecting a ring signal of the incoming telephone call.

13. A telephony device, comprising:
means for receiving an incoming phone call from a calling party via a telephone network;
means for generating a user alert in response to the incoming phone call, said generating means including a ring signal detection means;
means for enabling selective entry of a user message in response to the alert while the incoming call is pending and still ringing to the calling party;
means for playing the user message to the calling party, said playing means including means for transmitting said user message from the telephony device to a telephony device of the calling party via the telephone network; and
timing means responsive to the ring signal detection means for timing a predetermined period during which a user of the telephony device can select to generate the user message,
wherein the selective entry means includes means for selecting between recording one or more parameters insertable in a customized pre-recorded message and recording a message without parameters while the incoming call is pending,
wherein the receiving means includes a voice recognition unit for recognizing at least one spoken command, and
wherein the at least one spoken command includes a predetermined instruction and a variable parameter.

14. A method, comprising:
receiving an incoming phone call from a calling party at a telephony device of a called party via a telephone network;
generating a user alert in response to the incoming phone call;
enabling selective entry of a user message in response to the alert while the incoming call is pending and still ringing to the calling party;
playing the user message to the calling party and transmitting said user message from the telephony device to a telephony device of the calling party via the telephone network; and
timing a predetermined period during which a user of the telephony device can select to generate the user message,
wherein the enabling selective entry includes selecting between recording one or more parameters insertable in a customized pre-recorded message and recording a message without parameters while the incoming call is pending,
wherein the receiving includes recognizing at least one spoken command, and
wherein the at least one spoken command includes a predetermined instruction and a variable parameter.

\* \* \* \* \*